Jan. 20, 1970     M. BASCHE ET AL     3,490,516

INVERTED CONICAL TIP CRUCIBLE FOR CASTING

Filed July 24, 1967

INVENTORS
MALCOLM BASCHE
RICHARD D. SCHILE
BY

ATTORNEYS

United States Patent Office 3,490,516
Patented Jan. 20, 1970

3,490,516
INVERTED CONICAL TIP CRUCIBLE FOR CASTING
Malcolm Basche, West Hartford, and Richard D. Schile, Wethersfield, Conn., assignors, by mesne assignments, to the United States of America as represented by the Secretary of the Air Force
Filed July 24, 1967, Ser. No. 655,678
Int. Cl. B22d 41/08
U.S. Cl. 164—273                2 Claims

ABSTRACT OF THE DISCLOSURE

An inverted conical tip for the extrusion orifice of casting equipment utilizes the heat of the melt in the crucible for maintaining the melting point in the orifice area and prevents materials of extremely high melting points from freezing at the orifice and clogging the flow.

---

The high melting point and high reactivity of some metals, boron for example, whose melting point is in the area of 2000° C. make it difficult to melt and cast these metals in a pure state. Floating zone techniques or melting by induction in boron nitride crucibles have been used for melting boron. Generally a preconsolidated ingot is used in each of these processes to start the melting operation and provide coupling to the induction power supply. For extruding boron through an extremely small orifice, it is necessary that it be in a well fluidized state. In casting less reactive materials and those of lower melting point, a high degree of fluidity is obtained by super heating the material well above its melting point. It is not feasible to do this in the case of boron for several reasons.

Difficulties have been encountered in obtaining boron threads in a state of purity through available casting and extrusion methods and available crucible materials. At the high temperatures involved, the end product is contaminated by the crucible material.

Applicants found that a boron nitride crucible will not contaminate the end product.

Due to its high vapor pressure, it evaporates and condenses as a solid on the cooler portions of the crucible and cannot be remelted. Further, at 2000° C. any material of which the crucible may be made, boron nitride for example, will rapidly decompose.

Without superheating, it is very difficult to keep the boron emerging through the small orifice hot enough to prevent its freezing and clogging the flow. If it is hot enough, as stated above, evaporation and condensation is likely to occur.

Neither the conventional flat bottom crucible, shown in FIGURE 1, and the conical nozzle of FIGURE 2 can prevent the freezing of the melted material as it emerges through the small orifices provided, even when pressure is applied.

The heat loss through radiation from both the flat bottom crucible of FIGURE 1 or the conical nozzle of FIGURE 2 makes it impossible to maintain the material passing through the orifice in a molten state without raising the temperature of the melt excessively and endangering the solidity of the crucible. External heat shields have been used with varying success. Reaction may take place between evaporated metal from the susceptor and the crucible tip or wetting of the tip by the molten boron. In either case, a free flow of the melted material through the orifice is prevented.

Difficulties have been encountered in obtaining boron threads in a state of purity through available casting and extrusion methods and available crucible materials. As pointed out above, at the high temperatures involved there may be disintegration of the crucible material so that the end product is contaminated. Applicants have found that the extrusion process as carried out in applicants' device requires lower temperatures, and occasions less disintegration. If a boron nitride crucible is used at this lower temperature, such crucible material as is melted will not contaminate the end product for obvious reasons.

The object of the present invention is the provision of a device which removes the above described difficulties and makes possible the emergence of the metal flow, unimpeded by freezing as it passes through the orifice and without the decomposition of the crucible tip due to the high temperatures involved.

Another object of the invention is the provision of equipment and conditions which preclude evaporation of the molten material, and eliminates the necessity for the presence of heat shields and other forms of susceptors which themselves melt or evaporate.

A further object of the invention is the provision of a device for extrusion casting of metals at extremely high temperatures wherein the crucible orifice is located within the area of an inverted cone and therefore in an area where the melt emerging from the orifice is heated by the melt within the crucible. That is, the metal within the crucible and surrounding the cone acts as a susceptor to keep the area of the orifice hot and to prevent freezing of the molten material as it emerges.

A still further object of the invention is the provision or an effective instrument for use in fiberization processes, and constituting an advancement in the filament reinforcement industry, including specifically high production rates of boron filaments.

These and other advantages, features and objects of the invention will become more apparent from the following description taken in connection with the illustrative embodiments in the accompanying drawings.

Figure 1:
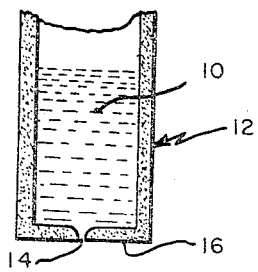
FIGURES 1 and 2 are vertical cross sectional views of extrusion crucibles for casting of metals, and represent the present state of the art.

Referring more in detail to the drawing, in FIGURE 1, showing a commonly used crucible, the material 10 for casting is heated in a crucible whose casting tip 12 is provided with an orifice 14 in a flattened end area 16.

Figure 2:
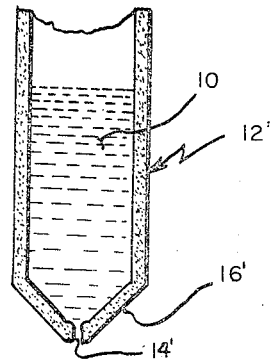

In FIGURE 2, which also shows the present state of the art, the orifice 14' is located at the tip of an exposed conical area 16'. The difficulties involved in both of these forms are described above.

Figure 3:
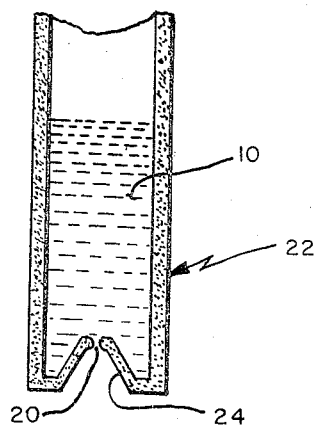
FIGURE 3 is a vertical cross sectional view of a crucible designed according to the invention.

FIGURE 3 is a longitudinal cross sectional view of the advancement in the art which the invention affords. The orifice 20, for the extrusion with pressure or free flow of the molten material 10 from the crucible 22, is in the form of an inverted cone 24 which recedes, placing the crucible opening at the apex of the cone and within the area of heat radiation from the crucible itself. The area around the orifice 20 can thus be maintained free from cooling by outside atmosphere and without the use of additional equipment to maintain the high temperature in the region of the orifice since the molten metal surrounding the inverted cone 24 acts as a susceptor to keep the immediate area around the orifice 20 at a high temperature.

Although the invention has been described with reference to a particular embodiment, it will be understood to those skilled in the art that the invention is capable of a variety of alternative embodiments within the spirit and scope of the appended claims.

We claim:
1. An improved crucible for casting molten metals at extremely high temperatures comprising, an inverted conical section forming the bottom portion of said crucible and receding thereinto, an extrusion orifice in the apex of said inverted conical section, the immediate area around said orifice being heated solely by the molten metal present in said crucible to prevent premature solidification and flow stoppage during the casting process.

2. The improved crucible defined in claim 1 wherein the crucible is fabricated of boron nitride, and the molten metal in said crucible is boron.

References Cited

UNITED STATES PATENTS 3,293,704 12/1966 Fromson _____ 164—281 X
3,304,585 2/1967 Marchlik _____ 164—281

FOREIGN PATENTS 341,113 11/1959 Switzerland.

J. SPENCER OVERHOLSER, Primary Examiner
R. SPENCER ANNEAR, Assistant Examiner

U.S. Cl. X.R.

18—8